June 5, 1956  R. MAYER  2,748,819
POTATO PEELER
Filed Jan. 28, 1953  2 Sheets-Sheet 1

INVENTOR
ROBERT MAYER,
BY
Irving Seidman
ATTORNEY

June 5, 1956  R. MAYER  2,748,819
POTATO PEELER
Filed Jan. 28, 1953  2 Sheets-Sheet 2
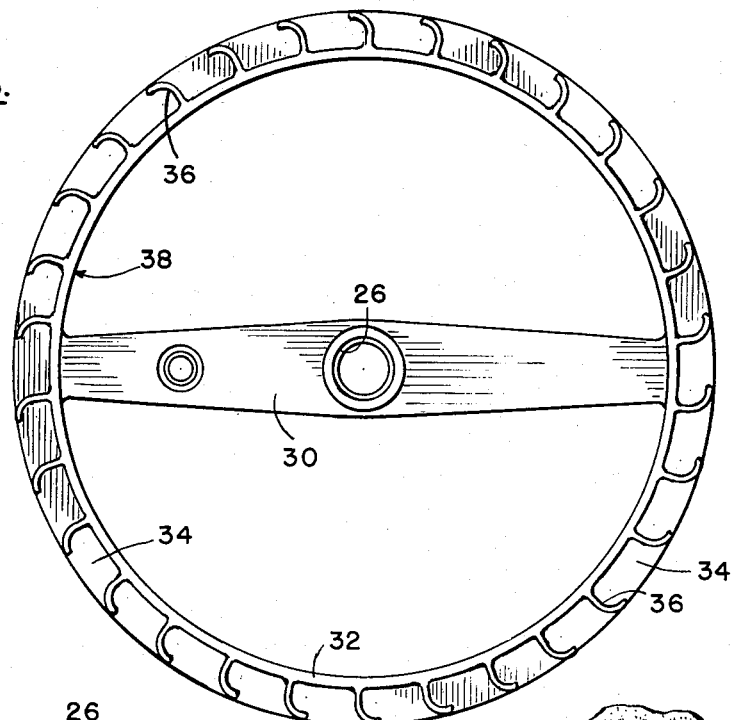
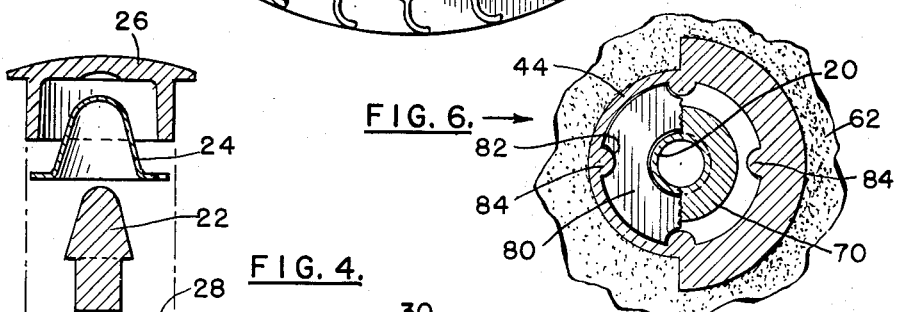
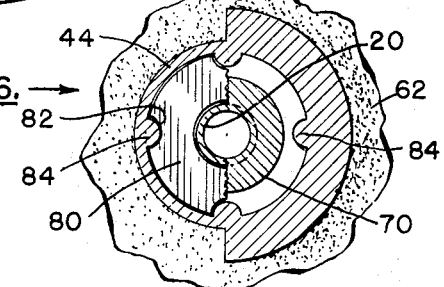
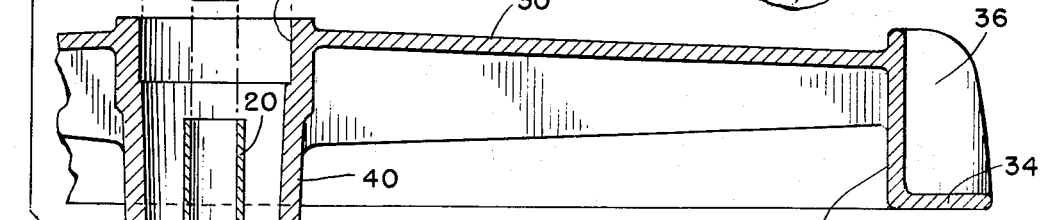
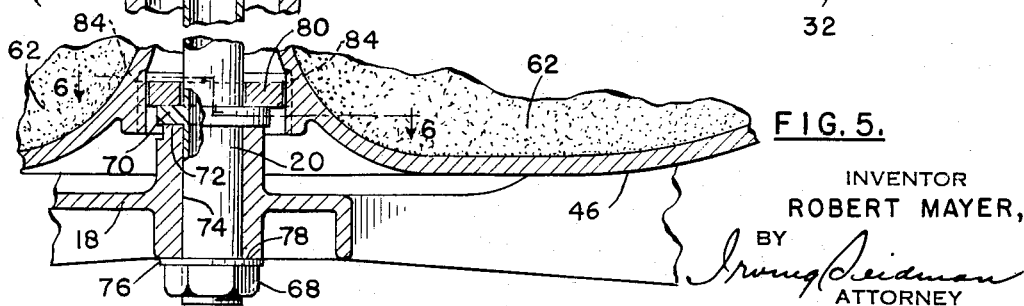
INVENTOR
ROBERT MAYER,
BY
ATTORNEY United States Patent Office 2,748,819
Patented June 5, 1956

2,748,819
POTATO PEELER

Robert Mayer, New York, N. Y., assignor to Herman H. Fox, New York, N. Y.

Application January 28, 1953, Serial No. 333,699

2 Claims. (Cl. 146—49)

This invention relates to an improved vegetable peeling and washing machine and has particular reference to a machine of said type which is hydraulically operated.

An object of this invention contemplates a machine of the character described which is of simple construction and easily operated by hydraulic power and is provided with means for manually operating same in the event of hydraulic power failure.

Another object of this invention is the provision of a machine which is particularly adapted for peeling and washing potatoes.

A still further object of this invention is the provision of a vegetable peeling and washing machine which comprises a bowl shaped receptacle having an orificed bottom and is provided with a dish shaped bottom member rotatably mounted about a vertical supporting member; the wall of the said bowl shaped receptacle and the upper surface of said dish shaped rotating member being lined with an abrasive substance.

A still further object of this invention resides in the provision of a power wheel having radially projecting vanes, the said power wheel being secured to the said dish-shaped bottom member and adapted to rotate same when actuated by hydraulic pressure.

Essentially, this invention is made entirely of plastic and consists of a bowl shaped housing having a perforated bottom. A central supporting member is upstanding from and attached to the bottom of said bowl shaped housing and acts as a support for a power wheel which is balanced upon the top of said central support and is adapted to rotate about said support and actuated by hydraulic power, and has, attached to the said power wheel a dish shaped lower member which rotates with the power wheel, and the lower inner surface of the said bowl shaped housing and upper surface of the said dish shaped bottom member being lined with an abrasive substance such as a cold application of Carborundum or equivalent to the said surfaces which through proper solvents is allowed to bond to the plastic in a cold setting process.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

Fig. 3 is a plan view of a part of the device and is termed a power wheel, to be fully described;

Fig. 4 is an enlarged exploded view of a fragmentary detail and will be hereinafter fully described;

Fig. 5 is an enlarged fragmentary detail of the lower central part of a section of the machine, and Fig. 6 is a sectional fragmentary detail taken along the planes indicated by the broken line 6—6 of Fig. 5.

Figure 1:
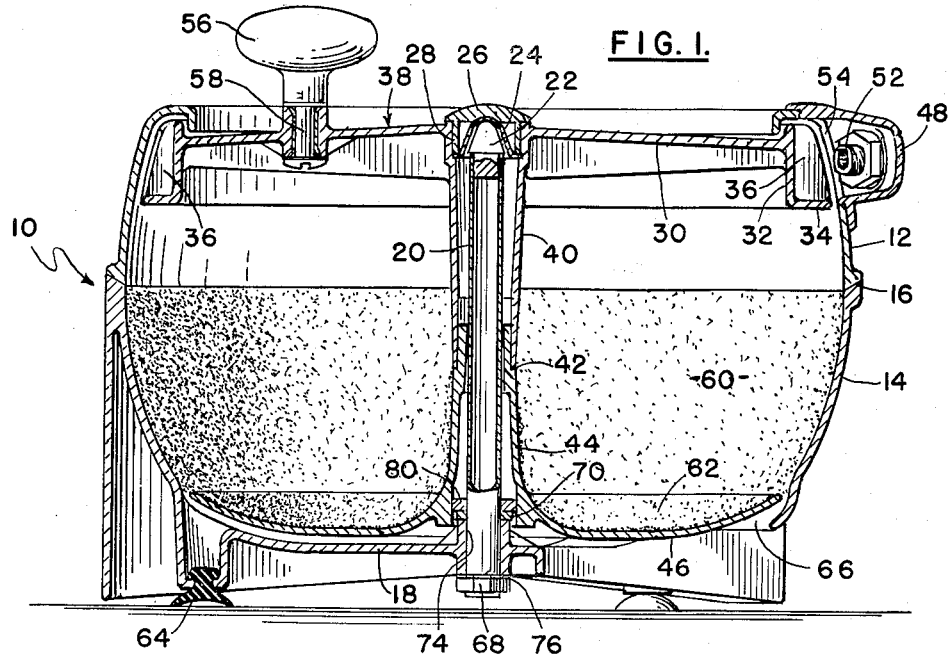
Fig. 1 is a sectional elevational view of a potato peeling and washing machine and is taken along a plane indicated by line 1—1 of Fig. 2.
Figure 2:
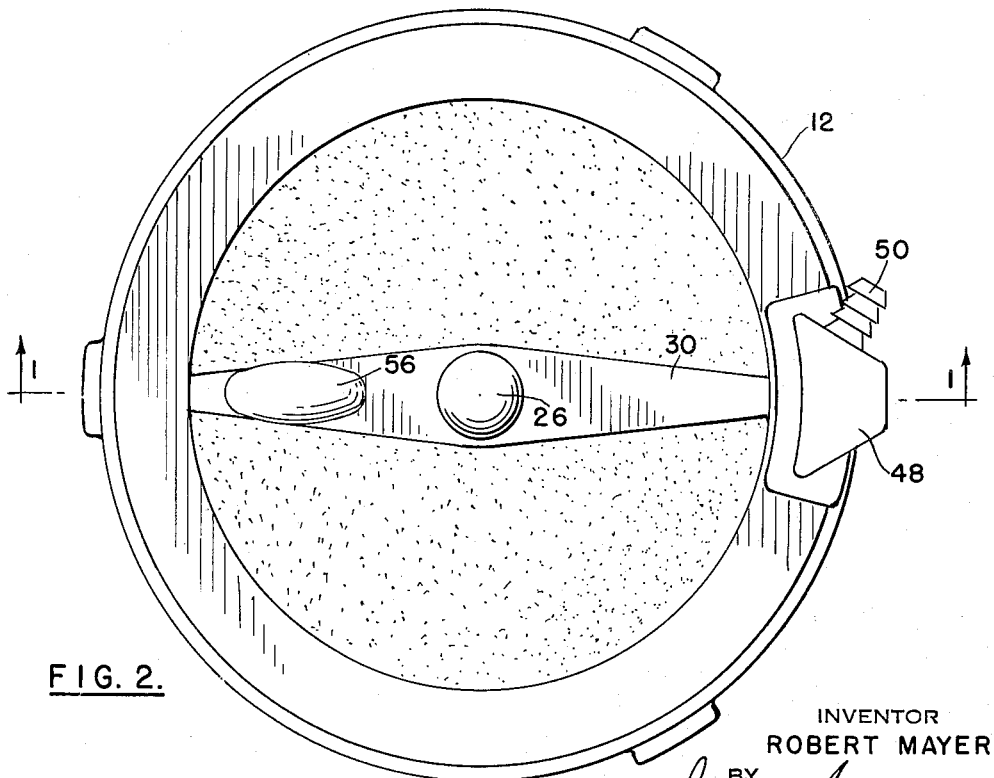
Fig. 2 is a top or plan view showing the abrasive surface upon the bottom of a rotating dish-like member.

Referring, in detail, to the parts wherein similar reference numerals indicate similar parts throughout, 10 designates, generally, a potato peeling and washing machine which comprises a bowl like member which forms a housing made up of an upper and lower section, 12 and 14 respectively to be hereinafter termed the upper and lower housing respectively. After the various parts are assembled, the upper and lower housings 12 and 13 respectively are cemented or welded together along the beveled circumferential joint 16. Centrally attached to the bottom 18 of the lower portion of said housing 14 there is an upstanding tubular supporting member 20 to the upper end of which there is secured a bearing 22 having a rounded or semi-spherical shaped upper surface. Resting upon said bearing 22 there is an intermediate cup shaped bearing member 24 which is disposed between the bearing 22 and a hub cap 26 which fits in and is secured to an orifice 28 formed in a channeled cross bar 30 which extends radially to an outer ring 32 having an outer peripheral flange formation 34. Spaced around and formed upon the said flange are radially extending cupped vanes 36 and with the bracketed arms 30 form what will be hereinafter termed a power wheel 38 which is adapted to rotate about the bearing 22. The said power wheel 38 is also formed with a downwardly extending tubular shank 40 to which there is attached at 42, by cementing or welding, a tubular shank 44 which extends upwardly and is formed upon a spinner plate 46 adapted to rotate with the said power wheel 38.

A small enclosure or housing unit 48, through which a hose attachment end 50 extends, is secured to the upper edge of the said housing 12. A nozzle 52 forms a continuation of the said hose attachment 50 and extends through an opening 54 to direct a water flow against the vanes 36 upon the said power wheel 38. The force of a stream of water thus directed against the vanes of the power wheel will rotate same and its attached spinner plate 46. To supplement the turning of the power wheel, in the event of water power failure, there is provided a handle or knob 56 which has swivel attachment, at 58, to the cross bar 30.

The inner peripheral wall 60 of the lower portion of said housing 14 and the upper surface 62 of spinner plate 46 is coated with an abrasive coating applied by a cold application of Carborundum or equivalent to the plastic, which through proper solvents is allowed to bond the plastic in a cold setting process.

Suction cups 64 are secured to the bottom of said housing 14 and are provided to hold the peeling machine stationary while in operation.

The central tubular support 20 is secured to the base 18 of the lower portion of said housing section 14 by means of a nut 68 which is threaded upon the lower end of the central tubular support 20 and is adapted to draw an annular shoulder 70 which is integrally formed upon the said central tubular support. The said annular shoulder 70 engaging against the upper edge of the wall 72 of an orifice 74 formed in the hose member 18 of the said lower housing section 14. A lock washer 76 is disposed between the nut 68 and the lower edge 78 of the orifice wall 74 and holds the central tubular housing section securely in place. An annular bearing member 80 having spaced grooves 82 is engageable over said annular shoulder 70, is slidable over said central tubular support 20 and engages splines 34 which are formed upon the lower portion of the upstanding tubular portion 44 of the spinner plate 46 (Figs. 5 and 6), the said grooved annular bearing member 80 is adapted to maintain the said spinner plate 46 in balanced alignment.

Vegetables to be peeled and washed are piled upon the spinner plate and the hydraulic power applied whereupon the spinner plate is revolved and the vegetables are tossed about by centrifugal action, and coming into contact with the abrasive surfaces are peeled, and the flow of water passing over the vegetables as they revolve with the spinner plate will pass out of an orifice 66 in the bottom of the said housing 14 and carry with it the waste material from the peeled vegetables and at the same time wash the vegetables.

I claim:

1. A vegetable peeling and washing machine comprising a bowl-shaped housing formed of an upper and a lower section, each of said sections having an inner and outer surface, said housing open at its top and having a bottom with an orifice and a central opening therein, a wall having an upper edge surrounding said central opening in said bottom, said upper and lower sections cemented together providing a smooth continuous inner surface for said bowl-shaped housing, said upper section having a downwardly directed top flange, a central upstanding tubular supporting member attached to said bottom and extending from the center of said bottom upwardly within said housing along the vertical medial line of said housing, said tubular supporting member having an upper and a lower end and having a male bearing member at its said upper end and an annular shoulder at its lower end, said annular shoulder adapted to rest upon said upper edge of said wall surrounding said central opening in said bottom, a power wheel comprising a cross bar, a downwardly extending tubular shank and an outer ring, said outer ring having a circumferential outwardly extending flange, radially projecting uniformly spaced cupped vanes extending outwardly from said outer ring and said extending flange, said vanes and flange spaced slightly from said upper section, said cross bar of said power wheel having a central cup-shaped female bearing member for seating upon said male bearing member of said supporting member, a hub cap covering said female bearing member, said downwardly directed top flange of said upper section overlapping said outer ring, a spinner plate having an inner and outer surface and an upwardly extending central tubular shank, spaced splines at the lower end of said upwardly extending central tubular shank, an annular bearing member having spaced grooves seated upon said upwardly extending central tubular shank and upon said annular shoulder, said spaced grooves of said annular bearing member engaging said spaced splines of said upwardly extending central tubular shank of said spinner plate, said last named tubular shank of said spinner plate attached to said downwardly extending tubular shank of said power wheel, said spinner plate rotatable with said power wheel and spaced slightly inwardly from said bottom of said housing, said splined bearing maintaining said spinner plate in alignment about said central supporting member, said inner surface of said lower section and said inner surface of said spinner plate coated with an abrasive material, a nozzle and water inlet positioned tangentially in said upper section and aligned with said cupped vanes for directing water against said vanes to rotate said power wheel and spinner plate, and a rotatable handle upon said cross bar of said power wheel to permit manual rotation of said power wheel.

2. A vegetable peeling and washing machine comprising a bowl-shaped housing formed of an upper and a lower section, each of said sections having an inner and outer surface, said housing open at its top and having a bottom with an orifice and a central opening therein, a wall having an upper edge surrounding said central opening in said bottom, said upper and lower sections cemented together providing a smooth continuous inner surface for said bowl-shaped housing, a central upstanding tubular supporting member attached to said bottom and extending from the center of said bottom upwardly within said housing along the vertical medial line of said housing, said tubular supporting member having an upper and a lower end and having a male bearing member at its said upper end and an annular shoulder at its lower end, said annular shoulder adapted to rest upon said upper edge of said wall surrounding said central opening in said bottom, a power wheel comprising a cross bar, a downwardly extending tubular shank and an outer ring, said outer ring having a circumferential outwardly extending flange, radially projecting uniformly spaced cupped vanes extending outwardly from said outer ring and said extending flange, said vanes and flange spaced slightly from said upper section, said cross bar of said power wheel having a central cup-shaped female bearing member for seating upon said male bearing member of said supporting member, a spinner plate having an inner and outer surface and an upwardly extending central tubular shank, spaced splines at the lower end of said upwardly extending central tubular shank, an annular bearing member having spaced grooves seated upon said upwardly extending central tubular shank and upon said annular shoulder, said spaced grooves of said annular bearing member engaging said spaced splines of said upwardly extending central tubular shank of said spinner plate, said last named tubular shank of said spinner plate attached to said downwardly extending tubular shank of said power wheel, said spinner plate rotatable with said power wheel and spaced slightly inwardly from said bottom of said housing, said bearing member maintaining said spinner plate in alignment about said central supporting member, said inner surface of said lower section and said inner surface of said spinner plate coated with an abrasive material, a nozzle and water inlet positioned tangentially in said upper section and aligned with said cupped vanes for directing water against said vanes to rotate said power wheel and spinner plate.

References Cited in the file of this patent

UNITED STATES PATENTS

| | | |
|---|---|---|
| 998,950 | Beyer | July 25, 1911 |
| 999,478 | Archer | Aug. 1, 1911 |
| 1,255,735 | Gasser | Feb. 5, 1918 |
| 1,681,737 | Lindahl | Aug. 21, 1928 |
| 2,117,765 | Johnston | May 17, 1938 |

FOREIGN PATENTS

| | | |
|---|---|---|
| 616,833 | Great Britain | Jan. 27, 1949 |